United States Patent Office 3,453,280
Patented July 1, 1969

3,453,280
CYANOMETHYLIDENE-TETRAHYDRO-QUINOLINE COMPOUNDS
Max A. Weaver and David J. Wallace, Kingsport, Tenn., assignors to Eastman Kodak Company, Rochester, N.Y., a corporation of New Jersey
No Drawing. Filed Mar. 14, 1967, Ser. No. 622,884
Int. Cl. C09b *23/04;* C07d *33/10;* D06p *1/00*
U.S. Cl. 260—287          8 Claims

ABSTRACT OF THE DISCLOSURE

Methine compounds containing a cyanomethylidene group at the 6-position of a 1,2,3,4-tetrahydroquinoline nucleus and the group

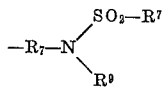

attached to the tetrahydroquinoline nitrogen atom, in which $R^7$ is an alkylene group and $R^8$ and $R^9$ each is an alkyl group, a cyclohexyl group, or a phenyl group. The methine compounds are useful as dyes for hydrophobic textile materials.

---

This invention relates to certain novel water-insoluble methine compounds and to the use of such compounds as dyes for hydrophobic fibers, yarns, and fabrics.

The compounds of the invention have the general formula (I)
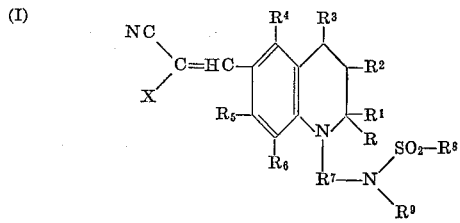

wherein

X represents cyano, carbamoyl, N-lower alkylcarbamoyl, N,N-di-lower alkylcarbamoyl, lower alkoxycarbonyl, lower cyanoalkoxycarbonyl, lower alkylsulfonyl, phenylsulfonyl, or phenylsulfonyl in which the phenyl group is substituted with lower alkyl, lower alkoxy, or halogen;

R, $R^1$, and $R^3$ are the same or different and each represents hydrogen or alkyl;

$R^2$ represents hydrogen, alkyl, alkoxy, halogen, hydroxy, or alkanoyloxy;

$R^4$ represents hydrogen, alkyl, alkoxy, halogen, or, when $R^5$ represents hydrogen or alkyl, phenyl;

$R^4$ represents hydrogen, alkyl, alkoxy, halogen, alkanoylamino, alkylsulfonamido, dialkylamino, or, when $R^4$ represents hydrogen or alkyl, phenyl;

$R^6$ represents hydrogen, alkyl, alkoxy, or halogen;

$R^7$ repreesnts an alkylene group;

$R^8$ and $R^9$ are the same or different and each represents an alkyl group, a cycloalkyl group, or a phenyl group.

The novel methine compounds of the invention are useful as dyes for hydrophobic textile materials such as cellulose acetate, polyester, and polyamide fibers. When applied to such textile materials in accordance with conventional dyeing procedures, the methine compounds of the invention give brilliant yellow dyeings exhibiting excellent fastness properties, particularly to light and sublimation when used on polyester fibers.

Typical lower alkoxycarbonyl groups represented by X include methoxycarbonyl, ethoxycarbonyl, propoxycarbonyl, isopropoxycarbonyl, butoxycarbonyl, etc. As used herein to describe a substituent, the word "lower" refers to an alkyl moiety having up to about 4 carbon atoms. Examples of the lower alkylsulfonyl groups which X can represent are methylsulfonyl, ethylsulfonyl, propylsulfonyl, butylsulfonyl, etc. Examples of the substituted phenylsulfonyl groups which X can be are p-tolylsulfonyl, p-anisylsulfonyl, p-chlorophenylsulfonyl, p-bromophenylsulfonyl, etc. Typical lower alkyl substituted carbamoyl groups are N-methylcarbamoyl, N-ethylcarbamoyl, N-propylcarbamoyl, N-butylcarbamoyl, N,N-dimethylcarbamoyl, N,N,-diethylcarbamoyl, N,N-dipropylcarbamoyl, etc.

The alkyl and alkoxy groups which each of R, $R^1$, $R^2$, $R^3$, $R^4$, $R^5$, and $R^6$ can represent can contain up to about 8 carbon atoms and can be straight or branched chain. Preferably, these alkyl and alkoxy groups contain up to about 4 carbon atoms, i.e. lower alkyl and lower alkoxy. Examples of the alkyl and alkoxy groups which can be present on the tetrahydroquinoline nucleus are methyl, ethyl, propyl, isopropyl, n-butyl, isobutyl, amyl, hexyl, 2-ethylhexyl, methoxy, ethoxy, propoxy, butoxy, hexoxy, etc.

Typical halogen atoms which $R^2$, $R^4$, $R^5$, and $R^6$ can represent are chloro and bromo. Examples of the alkanoyloxy groups which $R^2$ can represent are alkanoyloxy of up to about 8 carbon atoms such as acetoxy, propionoxy, butyroxy, etc. Preferably, the alkanoyloxy groups which can be represented by $R^2$ is lower alkanoyloxy, i.e. having up to about 4 carbon atoms.

The alkyl moiety of each of the alkanoylamino, alkylsulfonamido, or dialkylamino groups which $R^5$ can represent can contain up to about 8 carbon atoms, preferably up to about 4 carbon atoms. Illustrative of alkanoylamino groups are acetamido, propionamido, butyramido, etc. Exemplary alkylsulfonamido groups include methylsulfonamido, ethylsulfonamido, propylsulfonamido, butylsulfonamido, hexylsulfonamido, etc. As mentioned above, each of the alkyl groups present on the dialkylamino group which $R^5$ can represent can contain up to about 8 carbon atoms, e.g. methyl, ethyl, propyl, butyl, hexyl, etc. Typical of the dialkylamino groups are dimethylamino, diethylamino, butylmethylamino, etc.

The alkylene group represented by $R^7$ can be straight or branched chain, unsubstituted or substituted alkylene of up to about 8 carbon atoms. Preferably, $R^7$ represents a lower alkylene group having up to about 4 carbon atoms. Examples of the alkylene groups represented by $R^7$ are ethylene, propylene, isopropylene, n-butylene, isobutylene, hexamethylene, haloalkylene, e.g. 2-chloropropylene, 2-bromopropylene, chloroethylene, hydroxyalkylene, e.g. 2-hydroxypropylene, hydroxyethylene, lower alkanoyloxyalkylene, e.g. 2-acetoxypropylene, etc.

The alkyl group which each of $R^8$ and $R^9$ can represent can contain up to about 8 carbon atoms and can be straight or branch chain, unsubstituted or substituted. Typical alkyl groups represented by $R^9$ are methyl, ethyl, propyl, isopropyl, butyl, hexyl, 2-ethylhexyl; hydroxyalkyl, e.g. β-hydroxyethyl, 2,3-dihydroxypropyl; lower alkoxyalkyl, e.g. β-methoxyethyl; nitroalkyl, e.g. β-nitroethyl; cyanoalkyl, e.g. β-cyanoethyl; cyanoalkoxyalkyl, e.g. β-cyanoethoxyethyl; lower alkanoyloxyalkyl, e.g. β-acetoxyethyl; lower alkoxycarbonyl, e.g. β-ethoxycarbonylethyl; haloalkyl, e.g. β-chloroethyl-gamma-chloropropyl, β-bromoethyl; hydroxyhalogenoalkyl, e.g. gamma-chloro-β-hydroxypropyl; lower alkanoylaminoalkyl, e.g. β-acetamidoethyl; carbamoylalkyl, e.g. β-carbamoylethyl; N-lower alkylcarbamoylalkyl, e.g. β-N-methylcarbamoylethyl; N-phenylcarbamoyloxyalkyl, e.g. β-N-phenylcarbamoylethyl; lower alkylsulfonylalkyl, e.g. β-methylsulfonylethyl; arylalkyl, e.g. benzyl; benzoloxy, e.g. β-benzoyloxyethyl; phenoxyalkyl, e.g. β-phenoxyethyl; thiomorpholino-1,1-dioxide, e.g. gamma-thiomorpholino-1,1-dioxidepropyl, lower alkylsulfonamidoalkyl, e.g. methylsulfonaminoethyl; arylsulfonamido, e.g. β-phenylsulfonamidoethyl, β - p - tolylsulfonamidoethyl; N-phenylcarbamoyloxy, e.g. 2-N-phenylcarbamoyloxyethyl; pyrrolidinono, e.g. β-pyrrolidinonoethyl; lower dicarboximido, e.g. 2-succinimidoethyl, 3-glutarimidopropyl, 2-maleimidoethyl, 2-phthalimidoethyl; lower alkoxycarbonyloxy, e.g. 2-β-ethoxycarbonyloxyethyl; etc. The alkyl group which $R^8$ and $R^9$ can represent is preferably lower alkyl, e.g. having up to about 4 carbon atoms. However, when the alkyl group is substituted by a carbon containing substituent, e.g. alkoxy, the preferred substituted alkyl group can contain up to about 8 carbon atoms, e.g. delta-butoxybutyl.

The phenyl groups which each of $R^8$ and $R^9$ can represent include, for example, phenyl and phenyl substituted with lower alkyl, lower alkoxy, nitro, halogen, etc. Illustrative of such groups are phenyl, p-tolyl, m-nitrophenyl, o,p-dichlorophenyl, and p-anisyl. Cyclohexyl is typical of the cycloalkyl groups which each of $R^8$ and $R^9$ can represent.

As is well-known in the art, the primary color of the compounds of the invention is attributable to the conjugated cyanomethylidine-tetrahydroquinoline system. Thus, it is apparent that the substituents present on the tetrahydroquinoline group, on the alkylene group represented by $R^7$ and the groups represented by X, $R^8$, and $R^9$, as these substituents and groups are defined above, do not materially affect the primary usefulness of the compounds as dyes, i.e. the ability of the compounds to dye hydrophobic textile materials. As can be seen from the subsequent examples, the substituents and groups referred to above function primarily as auxochrome groups to control the shade of the compounds of the invention.

A particularly preferred group of the novel methine compounds of the invention have the formula

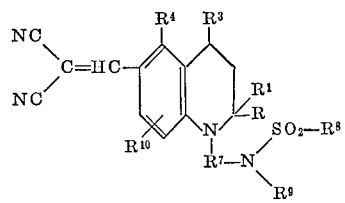

wherein

R, $R^1$, $R^3$, $R^4$, and $R^{10}$ are the same or different and each represents hydrogen or lower alkyl;

$R^7$ represents lower alkylene;

$R^8$ represents lower alkyl; phenyl; or phenyl substituted with lower alkyl, lower alkoxy, halogen, or nitro; and $R^9$ represents lower alkyl; lower alkyl substituted with alkoxy, cyano, hydroxy, halogen, lower alkanoyloxy, lower alkylsulfonamido, or pyrrolidinono; cyclohexyl; phenyl; or phenyl substituted with lower alkyl, lower alkoxy, halogen, or nitro.

The methine compounds of the invention are prepared by condensing a 6-formyl-1,2,3,4-tetrahydroquinoline having the formula (II)

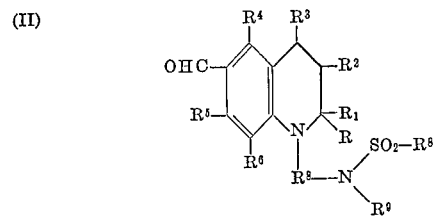

with an active methylene compound having the formula (III)    X—CH$_2$—CN in the presence of a basic catalyst such as piperidine. In Formulas II and III, X, R, $R^1$, $R^2$, $R^3$, $R^4$, $R^5$, $R^6$, $R^7$, $R^8$, and $R^9$ are defined above relative to the definition of general Formula I. The tetrahydroquinoline intermediates from which the aldehydes of Formula II are derived are prepared by heating an N-haloalkyl-1,2,3,4-tetrahydroquinoline in the presence of an N-substituted-sulfonamide according to the following reaction:

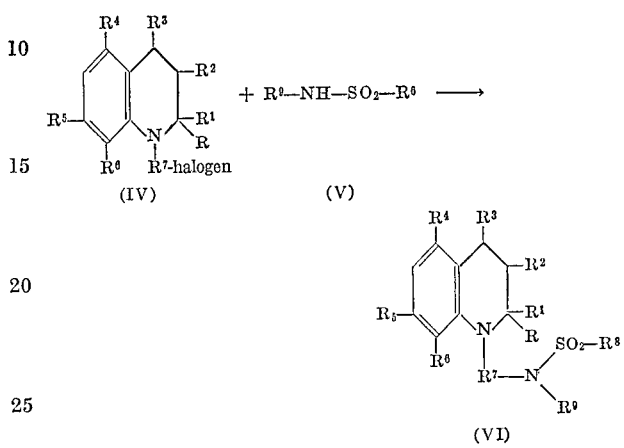

The compounds having Formula IV and V are commercially available or can be prepared according to well-known methods. The aldehydes of Formula II are obtained by treating the compounds of Formula VI with POCl$_3$ in the presence of dimethylformamide according to the well-known Vilsmeier reaction.

Examples of the compounds of Formula IV that can be used in preparing the novel methine compounds of the invention are N-2-chloroethyl-1,2,3,4-tetrahydroquinoline, N-2-chloroethyl-1,2,3,4-tetrahydro-2,7-dimethylquinoline, N-3-chloropropyl-1,2,3,4-tetrahydro-2,2,4-trimethylquinoline, N - (3-chloro-2-hydroxypropyl)-1,2,3,4-tetrahydro - 2,2,4-trimethyl-7-acetamidoquinoline, N-2-chloroethyl - 1,2,3,4-tetrahydro-2,2,4,7-tetramethylquinoline, N - (2-acetoxy-3-chloropropyl) 1,2,3,4-tetrahydro-2, 2,4-trimethyl-3-chloroquinoline, etc.

Examples of the N-substituted-sulfonamides having Formula V include N-methylmethanesulfonamide, N-(2-hydroxyethyl)methanesulfonamide, N - (2 - chloroethyl) ethanesulfonamide, 4'-nitromethanesulfonanilide, N-ethyl-p-tolylsulfonamide, N - (2 - cyanoethyl)-p-anisylsulfonamide, N - (2 - pyrrolidinonoethyl)-p-nitrobenzenesulfonamide, etc.

The following active methylene compounds are illustrative of the compounds of Formula III which can be used in the preparation of the methine compounds of this invention: malononitrile, methylcyanoacetate, ethylcyanoacetate, propylcyanoacetate, isopropylcyanoacetate, n-butylcyanoacetate, isobutylcyanoacetate, cyanoacetamide, methylsulfonylacetonitrile, phenylsulfonylacetonitrile, p-tolylsulfonylacetonitrile, etc.

The following examples will further describe and illustrate the methods for preparing the intermediates and novel methine compounds.

PREPARATION OF TETRAHYDROQUINOLINE INTERMEDIATES

Example 1

12.6 g. 1-(3-chloroethyl)-2,2,4,7-tetramethyl-1-2,3,4-tetrahydroquinoline, 5.5 g. N-methylmethanesulfonamide, 6.9 g. potassium carbonate, and 100 ml. dimethyl formamide are refluxed together for two hours. The reaction mixture is drowned into water. The product soon crystallizes and is collected by filtration and recrystallized from 2–B alcohol to give pure product, melting at 65–66° C. It has the following structure:

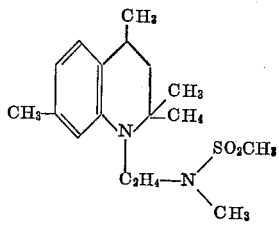

Example 2

6.3 g. 1-(2-chloroethyl)-2,2,4,7-tetramethyl-1,2,3,4-tetrahydroquinoline, 3.5 g. N-(2-hydroxyethyl)methanesulfonamide, 3.5 g. potassium carbonate, and 50 ml. dimethyl formamide are refluxed together for 2 hours. The reaction mixture is drowned into water, and the product extracted with chloroform. The chloroform extract is evaporated to give 7.5 g. of product having the formula:

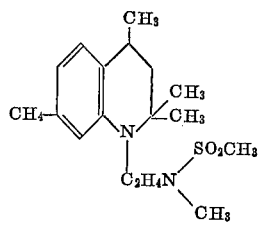

Example 3

5.04 g. 1-(2-chloroethyl)2,2,4,7-tetramethyl-1,2,3,4,-tetrahydroquinoline, 4.32 g. 4'-nitromethanesulfonanilide, 2.76 g. potassium carbonate, and 100 ml. dimethyl formamide are heated and stirred at 125° C for 2 hours. The reaction mixture is drowned into 600 ml. water. The product is collected by filtration, washed with water, air dried, and recrystallized from 250 ml. 2–B alcohol. The product melts at 145° C. and has the following structure:

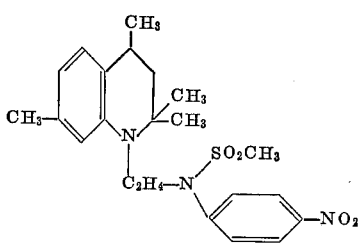

Example 4

2.16 g. of the intermediate from Example 3 above is dissolved in 4 ml. of dimethyl formamide. To this is added 1.0 ml. phosphorus oxychloride at 25–30° C. After heating 1 hour at 95° C. the reaction mixture is drowned on ice-water mixture. This mixture is made basic with a few drops of 50% NaOH and allowed to stand about 3 hours. The solid aldehyde is collected by filtration, washed with water, and air dried. After recrystallization from ethanol the product melts at 170–171° C. It has the following structure:

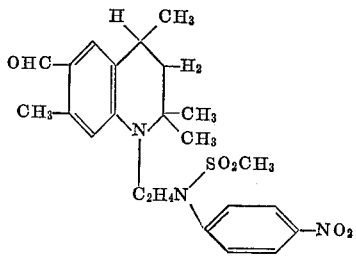

Example 5

5.04 g. N-β-chloroethyl-1,2,3,4-tetrahydro-2,2,4,7-tetramethylquinoline, 3.70 g. N-methyl-p-toluenesulfonamide, 3.76 g. potassium carbonate, and 50 ml. dimethylformamide are refluxed 2 hours and then cooled to about 25° C. To this mixture is added 2.5 ml. of POCl₃ dropwise below 30° C. After heating for 1 hour on a steam bath, the reaction mixture is drowned into an ice-water mixture. After neutralization with 50% NaOH, the aldehyde is collected by filtration, washed with water, and air dried. It is then recrystallized from ethanol. The product melts at 138–139° C. and has the structure:

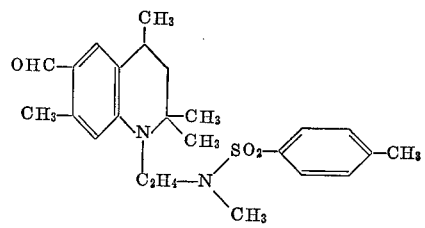

Example 6

5.04 g. of N-β-chloroethyl-1,2,3,4-tetrahydro-2,2,4,7-tetramethylquinoline, 5.64 g. N-[2-(2-p-toluenesulfonamido)ethyl]-2-pyrrolidinone, 2.76 g. potassium carbonate, and 50 ml. of dimethylformamide are refluxed 2 hours and then cooled. To this mixture is added 2.5 ml. POCl₃ at 20–25° C. After heating 30 minutes on a steam bath, the reaction is drowned into an ice-water mixture. This mixture is made basic with 50% NaOH and the product collected by filtration, washed with water, and air dried. It is recrystallized from ethanol and melts at 161–162° C. The aldehyde has the structure:

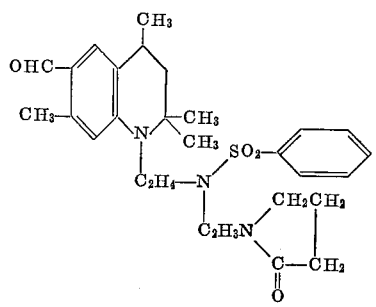

Example 7

5.04 g. N-β-chloroethyl-1,2,3,4-tetrahydro-2,2,4,7-tetramethylquinoline, 4.86 g. N-(3-methoxypropyl)-p-toluenesulfonamide, 3.76 g. potassium carbonate, and 50 ml. of dimethylformamide are refluxed for 2 hours and then cooled. To this mixture is added 2.5 ml. of POCl₃ at about 25° C. After heating for 1 hour on a steam bath, the reaction mixture is drowned into an ice-water mixture and made basic with 50% NaOH. The product is collected by filtration and recrystallized from ethanol. The aldehyde melts at 125–126° C. and has the formula:

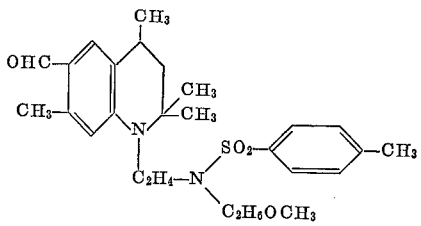

PREPARATION OF THE METHINE COMPOUNDS

Example 8

1.38 g. 6-formyl-N-[2-(N-p-nitrophenylmethanesulfonamido)ethyl] - 1,2,3,4 - tetrahydro - 2,2,4,7 - tetramethylquinoline, 0.20 malononitrile, 25 ml. 2–B alcohol, and 3 drops piperidine are refluxed together for 1 hour. The reaction mixture is allowed to cool and the yellow dye collected by filtration, washed with ethanol, and air dried. The product melts at 210–215° C. and has the following structure:

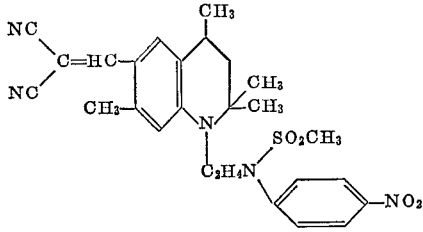

It dyes polyester fibers deep shades of yellow.

Example 9

2.07 g. 6-formyl-N-[2-(N-phenylmethanesulfonamido)ethyl] - 2,2,4,7 - tetramethyl - 1,2,3,4 - tetrahydroquinoline, 0.33 g. malononitrile, 3 drops piperidine, and 40 ml. 2–B alcohol are refluxed together for 1 hour. The reaction mixture is allowed to cool and the yellow product collected by filtration and air dried. The product melts at 181–185° C. It has the following structure:

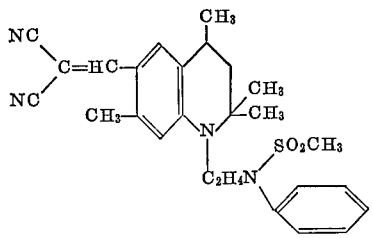

This dye colors polyester fibers bright shades of yellow having excellent light and sublimation fastness.

Example 10

2.07 g. aldehyde of Example 9, 0.50 g. methylcyanoacetate, 3 drops piperidine, and 40 ml. 2–B alcohol are refluxed together for 1 hour. The reaction mixture is allowed to cool, the yellow compound is collected by filtration and air dried. This dye colors cellulose acetate and polyester fibers deep shades of yellow and has the following structure:

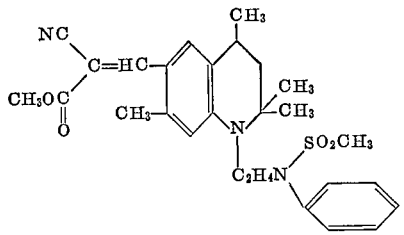

Example 11

2.07 g. aldehyde of Example 9, 0.42 g. 2-cyanoacetamide, 3 drops, 40 ml. 2–B alcohol are refluxed together for 3 hours. After allowing the reaction mixture to cool, the yellow compound is collected by filtration, and air dried. The product dyes nylon and polyester fibers yellow and has the following structure:

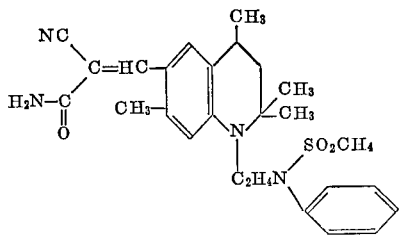

Example 12

2.07 g. aldehyde of Example 9, 0.91 g. phenylsulfonylacetonitrile are reacted together as in the preceding example to give a yellow compound of the following structure:

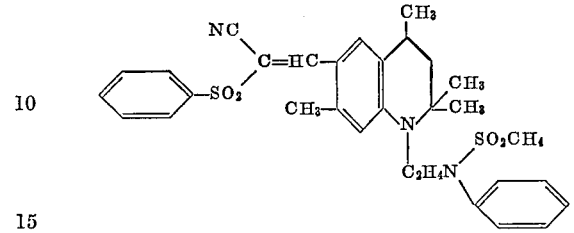

This dye has good affinity for polyester fibers and produces dyeings of good fastness properties.

Example 13

3.24 g. 2,7-dimethyl-6-formyl-1-[2-(N-methylmethanesulfonamido)ethyl] - 1,2,3,4 - tetrahydroquinoline, 0.66 g. malononitrile, 5 drops piperidine, and 50 ml. 2-B alcohol are reacted together as in the preceding examples to give a yellow dye of the following structure:

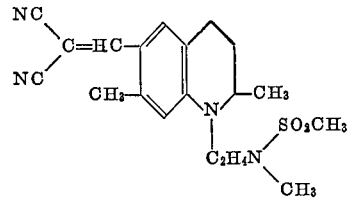

This dye has excellent fastness properties when dyed on polyester fibers.

Example 14

2.28 g. 6-formyl-N-[2-(N-phenyl - n - butanesulfonamido)ethyl]-1,2,3,4-tetrahydro - 2,2,4,7, - tetramethylquinoline, 0.33 g. malononitrile, 3 drops piperidine, 30 ml. 2–B alcohol are refluxed together for 1 hour. The reaction mixture is allowed to cool. The product, which crystallizes on standing, is collected by filtration and air dried. It dyes polyester fibers bright yellow shades and has the following structure:

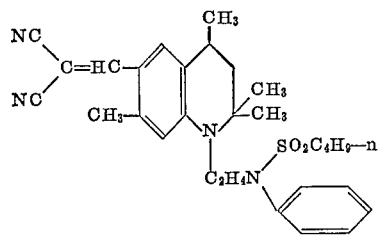

Example 15

The aldehyde from Example 5 (2.14 g.), 0.33 g. malononitrile, 5 drops piperidine, and 25 ml. of 2-B alcohol are refluxed for 1 hour. After allowing to cool, the yellow compound is collected by filtration and air dried. It melts at 181–183° C. and has the structure:

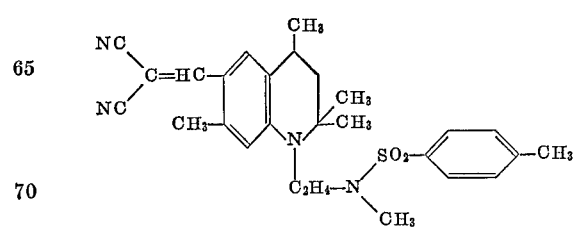

This methine compound produces bright yellow shades on polyester fibers and has excellent light and sublimation fastness.

Example 16

The aldehyde from Example 6 (2.63 g.), 0.33 g. malononitrile, 5 drops piperidine, and 25 ml. ethanol are refluxed 1 hour and allowed to cool. The yellow methine compound is collected by filtration, washed with ethanol, and air dried. It melts at 191–192° C. and has the structure:

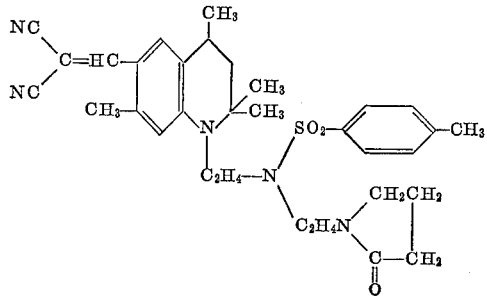

This compound imparts fast yellow shades to polyester and nylon fibers.

Example 17

The aldehyde from Example 7 (2.4 g.) is reacted with 0.33 g. malononitrile as described in the preceding examples to yield a compound of the formula

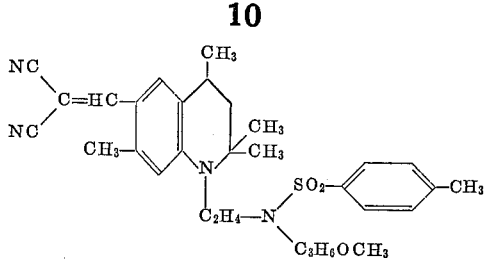

This methine compound produces bright yellow dyeings on polyester fibers.

The compounds described in the examples of the following table are prepared according to the procedure described in Examples 1–17 and correspond to the general formula

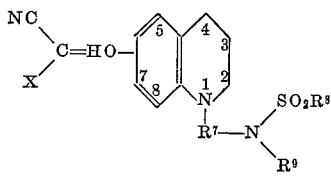

wherein the tetrahydroquinoline ring can be substituted. The methine compounds of the following examples give yellow dyeings on polyester fibers.

| Example No. | X | Tetrahydroquinoline substituents | $R^7$ | $R^8$ | $R^9$ |
|---|---|---|---|---|---|
| 18 | —CN | 2,7-di-$CH_3$ | —$CH_2CH_2$— | —$C_2H_5$ | Phenyl. |
| 19 | —CN | 2,7-di-$CH_3$ | —$CH_2CH_2$— | Phenyl | Do. |
| 20 | —CN | 2,7-di-$CH_3$ | —$CH_2CH_2$— | do | —$CH_3$ |
| 21 | —CN | 2,7-di-$CH_3$ | —$CH_2CH_2$— | do | —$C_4H_{9-n}$ |
| 22 | —CN | 2,7-di-$CH_3$ | —$CH_2CH_2$— | —$CH_3$ | —$C_2H_4Cl$ |
| 23 | —CN | 7-Cl-2-$CH_3$ | —$CH_2CH_2$— | —$CH_3$ | —$CH_3$ |
| 24 | —CN | 7-Cl-2-$CH_3$ | —$CH_2CH_2$— | —$C_2H_5$ | —$C_2H_5$ |
| 25 | —CN | 7-$OCH_3$-2,2,4-tri-$CH_3$ | —$CH_2CH_2$— | —$C_2H_5$ | —$C_2H_5$ |
| 26 | —CN | 7-$OCH_3$-2,2,4-tri-$CH_3$ | —$CH_2CH_2$— | —$CH_3$ | —$C_2H_4CN$ |
| 27 | —$COOCH_3$ | 7-$OCH_3$-2,2,4-tri-$CH_3$ | —$CH_2CH_2$— | —$CH_3$ | —$C_2H_4CN$ |
| 28 | —$COOCH_3$ | None | —$CH_2CH_2$— | —$CH_3$ | —$C_2H_4OCH_3$ |
| 29 | —CN | do | —$(CH_2)_3$— | —$CH_3$ | Phenyl. |
| 30 | —CN | do | —$CH_2$—$CH$(—$CH_3$)— | —$CH_3$ | Do. |
| 31 | —CN | 2,2,4,7-tetra-$CH_3$ | —$CH_2$—$CH$(Cl)—$CH_2$— | —$CH_3$ | Do. |
| 32 | —CN | 2,2,4,7-tetra-$CH_3$ | —$CH_2CH_2$— | —$CH_3$ | Cyclohexyl. |
| 33 | —CN | 2,2,4,7-tetra-$CH_3$ | —$CH_2CH_2$— | Phenyl | Do. |
| 34 | —CN | 2,2,4,7-tetra-$CH_3$ | —$CH_2CH_2$— | Br-$C_2H_4$— | Do. |
| 35 | —CN | 2,2,4,7-tetra-$CH_3$ | —$CH_2CH_2$— | p-Tolyl | —$C_4H_{9-n}$ |
| 36 | —CN | 2,2,4,7-tetra-$CH_3$ | —$CH_2CH_2$— | —$CH_3$ | p-Chlorophenyl. |
| 37 | —CN | 2,2,4,7-tetra-$CH_3$ | —$CH_2CH_2$— | —$CH_3$ | p-Methoxyphenyl. |
| 38 | —CN | 2,2,4,5-tetra-$CH_3$ | —$CH_2CH_2$— | —$CH_3$ | Do. |
| 39 | —CN | 2,2,4,8-tetra-$CH_3$ | —$CH_2CH_2$— | —$CH_3$ | Do. |
| 40 | —CN | 2-$CH(CH_3)_2$-7-$CH_3$ | —$CH_2CH_2$— | —$CH_3$ | Do. |
| 41 | —CN | 7-$NHCOCH_3$-2-$CH_3$ | —$CH_2CH_2$— | —$CH_3$ | Do. |
| 42 | —CN | 7-phenyl-2-$CH_3$ | —$CH_2CH_2$— | —$CH_3$ | Do. |
| 43 | —CN | 7-phenoxy-2-$CH_3$ | —$CH_2CH_2$— | —$CH_3$ | Do. |
| 44 | —CN | 3-Cl-7-$CH_3$ | —$CH_2CH_2$— | —$CH_3$ | Do. |
| 45 | —$CONH_2$ | 2,7-di-$CH_3$ | —$CH_2CH_2$— | —$CH_3$ | Do. |
| 46 | —$COOC_2H_4CN$ | 2,7-di-$CH_3$ | —$CH_2CH_2$— | —$CH_3$ | Do. |
| 47 | —$SO_2CH_3$ | 2,7-di-$CH_3$ | —$CH_2CH_2$— | —$CH_3$ | Do. |
| 48 | —$SO_2$—C$_6$H$_4$—Cl | 2,7-di-$CH_3$ | —$CH_2CH_2$— | —$CH_3$ | Do. |
| 49 | —CN | 2,2,4,7-tetra-$CH_3$ | —$CH_2CH_2$— | p-Tolyl | —$C_2H_5$ |
| 50 | —CN | 2,2,4,7-tetra-$CH_3$ | —$CH_2CH_2$— | do | Cyclohexyl. |
| 51 | —CN | 2,2,4,7-tetra-$CH_3$ | —$CH_2CH_2$— | do | —$C_2H_4CN$ |
| 52 | —CN | 2,2,4,7-tetra-$CH_3$ | —$CH_2CH_2$— | do | —$C_2H_4Cl$ |
| 53 | —CN | 2,2,4,7-tetra-$CH_3$ | —$CH_2CH_2$— | do | —$C_2H_4OCH_3$ |
| 54 | —CN | 2,2,4,7-tetra-$CH_3$ | —$CH_2CH_2$— | do | —$CH_2CH(CH_3)CN$ |
| 55 | —CN | 2,2,4,7-tetra-$CH_3$ | —$CH_2CH_2$— | do | —$C_2H_4O$—C$_6$H$_5$ |
| 56 | —CN | 2,2,4,7-tetra-$CH_3$ | —$CH_2CH_2$— | do | —$C_2H_4SCH_3$ |
| 57 | —CN | 2,2,4,7-tetra-$CH_3$ | —$CH_2CH_2$— | do | —$C_2H_4SO_2CH_3$ |
| 58 | —CN | 2,2,4,7-tetra-$CH_3$ | —$CH_2CH_2$— | do | —$C_2H_4OOCCH_3$ |
| 59 | —CN | 2,2,4,7-tetra-$CH_3$ | —$CH_2CH_2$— | do | —$C_2H_4OCOC_2H_5$ |
| 60 | —CN | 2,2,4,7-tetra-$CH_3$ | —$CH_2CH_2$— | do | —$C_2H_4OOC$—C$_6$H$_5$ |

| Example No. | X | Tetrahydroquinoline substituents | R7 | R8 | R9 |
| --- | --- | --- | --- | --- | --- |
| 61 | —CN | 2,2,4,7-tetra-CH$_3$ | —CH$_2$CH$_2$— | do |  |
| 62 | —CN | 2,2,4,7-tetra-CH$_3$ | —CH$_2$CH$_2$— | do | C$_2$H$_4$—N⟨ ⟩SO$_2$ |
| 63 | —CN | 2,2,4,7-tetra-CH$_3$ | —CH$_2$CH$_2$— | do | —C$_2$H$_4$NHCOCH$_3$ |
| 64 | —CN | 2,2,4,7-tetra-CH$_3$ | —CH$_2$CH$_2$— | do | —C$_2$H$_4$NHSO$_2$CH$_3$ |
| 65 | —CN | 2,2,4,7-tetra-CH$_3$ | —CH$_2$CH$_2$— | do | —C$_2$H$_4$NHSO$_2$—⟨ ⟩—CH$_3$ |
| 66 | —CN | 2,2,4,7-tetra-CH$_3$ | —CH$_2$CH$_2$— | do | —C$_2$H$_4$N(CH$_3$)—SO$_2$—⟨ ⟩—CH$_3$ |
| 67 | —CN | 2,2,4,7-tetra-CH$_3$ | —CH$_2$CH$_2$— | do | —C$_2$H$_4$CONH$_2$ |
| 68 | —CN | 2,2,4,7-tetra-CH$_3$ | —CH$_2$CH$_2$— | do | —C$_2$H$_4$COOC$_2$H$_5$ |

The distinctive structure of the methine compounds of the invention imparts unexpected properties to the compounds, including the above-described light fastness and sublimation resistance. Thus, we have found the compounds of the invention to have valuable properties when used as dyes and when tested by methods such as described in the A.A.T.C.C. Technical Manual, 1965 edition.

The methine compounds of the invention can be used for dyeing hydrophobic fibers such as linear polyester, cellulose ester, acrylic, polyamide, etc., fibers in the manner described in U.S. Patents 2,880,050, 2,757,064, 2,782,187 and 3,043,827. The following example illustrates one method by which the compounds of the invention can be used to dye polyester textile materials.

Example 69

An amount of 0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. Then, 3 cc. of "Dacronyx" (a chlorinated benzene emulsion) are added and 10 grams of a textile fabric made of poly(ethylene terephthalate) fibers are entered. The fabric is worked 10 minutes without heat and then for 10 minutes at 80° C. The dye bath is then brought to the boil and held at the boil for one hour. Following this, the fabric is rinsed in warm water, then scoured in aqueous 0.2% soap, 0.2% soda ash solution. After scouring, the fabric is rinsed with water and dried.

When the compounds of the invention are used to dye polyamide textile materials, the above procedure can be employed except the "Dacronyx" dyeing assistant need not be used. When cellulose acetate fibers are dyed with the compounds, the above procedure can be followed omitting the "Dacronyx" dyeing assistant and carrying out the dyeing at 80° C. for one hour rather than at the boil.

The compounds of the invention can also be applied to polyester textile materials by the heat fixation technique of dyeing. This procedure is described in U.S. Patent 2,663,612 and in the American Dyestuff Reporter, 42, 1 (1953).

Accordingly, since the methine compounds of the invention are water-insoluble, they can be applied from aqueous dispersions in the manner of the so-called "dispersed dyes" according to the procedure described above. However, coloration can also be effected, for example, by incorporating the compounds into the spinning dope or melt and spinning the fiber as usual.

The compounds of the invention are not necessarily equivalent when used as dyes. The degree of dye affinity varies, for example, depending upon the material being dyed and the formula of the methine compound. Thus, for example, all the dyes will not have the same degree of affinity for the same material.

Polymeric linear polyester materials of the terephtalate type are illustrative of the linear aromatic polyester textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Patent 2,901,446. Poly(ethylene terephthalate) polyester fibers are described, for example, in U.S. Patent 2,465,319. The polymeric liner polyester materials disclosed in U.S. Patents 2,945,010, 2,957,745, and 2,989,363, for example, can be dyed. The linear aromatic polyester materials specifically named have a melting point of at least 200° C.

Examples of the polyamide fibers that can be dyed with the compounds of the invention are those consisting of nylon 66, made by the polymerization of adipic acid and hexamethylenediamine, nylon 6, prepared from epsilon-aminocaproic acid lectam, and nylon 8. The cellulose acetate fibers that can be dyed with the compounds of the invention include fibers consisting of either cellulose triacetate or partially hydrolyzed cellulose acetate.

The invention has been described in considerable detail with particular reference to certain preferred embodiments thereof, but it will be understood that variations and modifications can be effected within the spirit and scope of the invention as described above and as defined in the appended claims.

We claim:

1. A water-insoluble methine compound having the formula

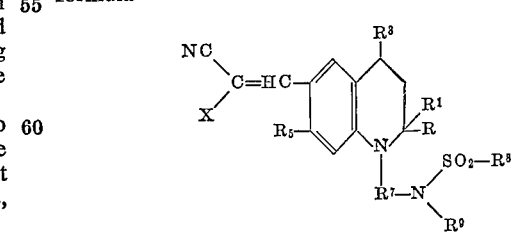

wherein
X is cyano, carbamoyl, N-lower alkylcarbamoyl, N,N-di-lower alkoxycarbonyl, lower alkoxycarbamoyl, lower cyanoalkoxycarbonyl, lower alkylsulfonyl, phenylsulfonyl, or phenylsulfonyl in which the phenyl group is substituted with lower alkyl, lower alkoxy, or halogen;

R, R$^1$ and R$^3$ are the same or different and each is hydrogen or methyl;

R$^5$ is hydrogen, methyl, lower alkoxy, halogen, lower alkanoylamino, lower alkylsulfonamido, di-lower alkylamino, phenyl, or phenoxy;

R⁷ is lower alkylene, lower haloalkylene, lower hydroxyalkylene, or lower alkanoyloxyalkylene; and R⁸ and R⁹ are the same or different and each is an alkyl group, a cyclohexyl group, or a phenyl group.

2. A compound according to claim 1 wherein
X is cyano;
R, R¹ and R³ are the same or different and each is hydrogen or methyl;
R⁵ is hydrogen, methyl, lower alkoxy, halogen, lower alkanoylamino, lower alkylsulfonamido, or di-lower alkylamino;
R⁷ is lower alkylene;
R⁸ is lower alkyl, phenyl, or phenyl substituted with lower alkyl, lower alkoxy, halogen, or nitro; and
R⁹ is a lower alkyl group, cyclohexyl, phenyl, or phenyl substituted with lower alkyl, lower alkoxy, halogen, or nitro.

3. A compound according to claim 1 wherein
X is cyano;
R, R¹ and R³ are the same or different and each is hydrogen or methyl;
R⁵ is hydrogen or methyl;
R⁷ is lower alkylene;
R⁸ is lower alkyl, phenyl, or phenyl substituted with lower alkyl, lower alkoxy, halogen, or nitro; and
R⁹ is lower alkyl; lower alkyl substituted with lower alkoxy, cyano, hydroxy, halogen, lower alkanoyloxy, lower alkylsulfonamido, or pyrrolidinono; cyclohexyl; phenyl; or phenyl substituted with lower alkyl, lower alkoxy, halogen, or nitro.

4. A compound according to claim 1 having the formula

5. A compound according to claim 1 having the formula

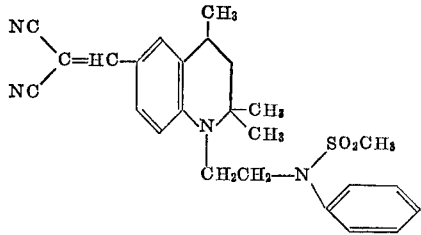

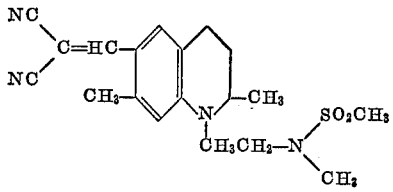

6. A compound according to claim 1 having the formula

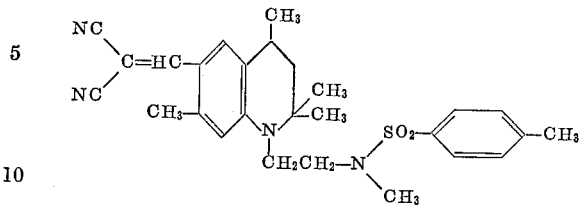

7. A compound according to claim 1 having the formula

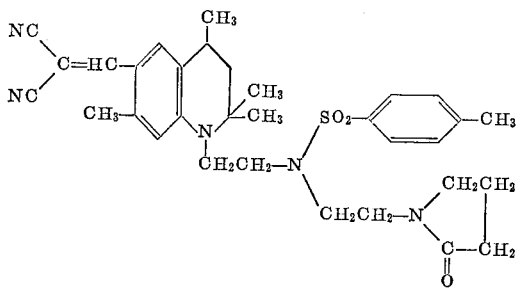

8. A compound according to claim 1 having the formula

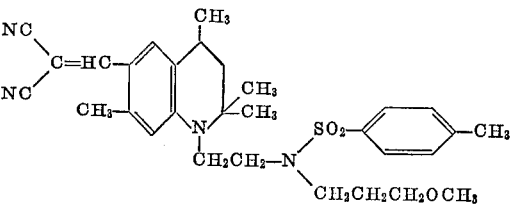

References Cited

UNITED STATES PATENTS

| 2,566,259 | 8/1951 | Thirtle et al. | 260—283 |
| 2,985,656 | 5/1961 | Weber | 260—329.2 |
| 3,247,211 | 4/1966 | Weaver | 260—287 |

NICHOLAS S. RIZZO, *Primary Examiner.*

D. G. DAUS, *Assistant Examiner.*

U.S. Cl. X.R.

8—55; 260—247.1, 281, 283, 288, 326.82, 332.1, 465, 465.1, 465.4, 465.8, 556